United States Patent [19]
McKeon

[11] Patent Number: 6,054,076
[45] Date of Patent: Apr. 25, 2000

[54] ACCUMULATOR HEAD BLOW MOLDING MACHINE AND METHOD

[75] Inventor: William H. McKeon, York, Pa.

[73] Assignee: Graham Engineering Corporation, York, Pa.

[21] Appl. No.: 09/053,994

[22] Filed: Apr. 2, 1998

[51] Int. Cl.$^7$ ............................. B29C 49/56; B29C 49/78
[52] U.S. Cl. ...................... 264/40.5; 264/523; 264/540; 425/150; 425/532; 425/541; 425/167; 425/451.2
[58] Field of Search ................................. 264/40.5, 523, 264/540; 425/150, 532, 541, 135, 138, 167, 451.2

[56] References Cited

U.S. PATENT DOCUMENTS

| | | |
|---|---|---|
| 3,344,470 | 10/1967 | Hufford . |
| 3,767,341 | 10/1973 | Siebelhoff et al. ..................... 425/150 |
| 3,807,929 | 4/1974 | Moore ................................. 425/387 B |
| 3,848,525 | 11/1974 | Kent et al. ............................... 100/48 |
| 4,148,203 | 4/1979 | Farazandeh et al. ..................... 72/21 |
| 4,150,080 | 4/1979 | Hagen .................................... 264/523 |
| 4,184,827 | 1/1980 | von Herrmann et al. ............. 425/135 |
| 4,447,198 | 5/1984 | Long et al. ............................. 425/140 |
| 5,238,389 | 8/1993 | Brandau et al. ....................... 425/522 |
| 5,250,238 | 10/1993 | Kiefer et al. .......................... 264/40.5 |
| 5,269,985 | 12/1993 | Kanou et al. .......................... 264/40.5 |
| 5,368,462 | 11/1994 | Kiefer et al. ........................... 425/150 |
| 5,634,398 | 6/1997 | McGee et al. ............................ 100/43 |
| 5,662,842 | 9/1997 | Sadr et al. ............................. 264/40.5 |

FOREIGN PATENT DOCUMENTS

| | | |
|---|---|---|
| 0 481 259 A1 | 4/1992 | European Pat. Off. . |
| 0 629 455 A1 | 12/1994 | European Pat. Off. . |
| 0 693 358 A1 | 1/1996 | European Pat. Off. . |
| 0 727 295 A3 | 8/1996 | European Pat. Off. . |
| 2003440 | 11/1969 | France . |
| 23 38 483 | 2/1975 | Germany . |
| 33 16 285 A1 | 11/1984 | Germany . |
| 42 23 314 A1 | 1/1994 | Germany . |
| 61-261017 | 11/1986 | Japan . |
| 02006114 | 1/1990 | Japan . |
| 1196536 | 6/1970 | United Kingdom . |
| 2087300 | 5/1982 | United Kingdom . |
| WO 88/07572 | 10/1988 | WIPO . |

OTHER PUBLICATIONS

Barber Colman Company, MACO EZ PRO Position Control, Feb. 1997, 4 pages.

Barber Colman Company, EZ–PRO Setup, 36 pages.

*Primary Examiner*—Mathieu D. Vargot
*Attorney, Agent, or Firm*—Thomas Hooker, P.C.

[57] ABSTRACT

An accumulator-type blow molding machine includes hydraulic cylinders for closing mold parts on platens and control systems for valves flowing hydraulic fluid to the cylinders. The control systems generate work output signals for the valves according to the operational parameters of the valves, the hydraulic systems and the bearings supporting the platens.

22 Claims, 2 Drawing Sheets

ACCUMULATOR HEAD BLOW MOLDING MACHINE AND METHOD

FIELD OF THE INVENTION

The invention relates to blow molding machines with hydraulic closing cylinders and electronic systems for controlling movement of mold parts from an open position to a closed position, and to related methods.

DESCRIPTION OF THE PRIOR ART

Prior blow molding machines with hydraulic closing cylinders use separate electronic controls for moving each platen from an open position to a closed position where mold parts on the platens capture a parison and engage each other. These controls each include an electronic controller which receives a platen location input from a linear transducer and compares the input to a predetermined time/distance closing path stored in memory to generate an output signal. The output signal is applied to a hydraulic valve to control the flow of hydraulic fluid to one or more hydraulic closing cylinders for the platen. The cylinders receive hydraulic fluid as required to move the platen and mold part along the programmed time/distance closing path.

The signal generated by the electronic controller is linearly related to the calculated volume of hydraulic fluid required to be flowed through the valve for proper closure of the platen and mold part. Conventional hydraulic valves, however, are solenoid actuated and do not respond linearly to voltage inputs received from controllers. This means that the outputs of the valve are not linearly related to the signals generated by the controllers and can result in the platens and mold parts closing along time/distance closing paths different than the desired paths.

Blow molding machines with hydraulically closed platens and mold parts include hydraulic and mechanical systems for each mold part. These systems effect the actual closing paths for the parts. For instance, the hydraulic systems include pressure lines with bends and changes in cross sectional flow area and different lengths, all of which can contribute to unpredictable pressure changes along the line and altered flow to the closing cylinders. The operating parameters for the two hydraulic systems used to close the two platens are inevitably different because of the different lengths and shapes of the pressure lines. The mechanical systems include bearings supporting the platens which may have non-uniform frictional loadings. The performance of the hydraulic systems and the mechanical systems may change during the production life of the blow molding machine.

Changes in these systems can affect the ability of a conventional electronic control to move the platen and mold part along a predetermined time/distance closing path. For instance, in a blow molding machine where both parts must be closed exactly identically along mirror image time/distance closing paths the hydraulic systems for one part may have different length and area pressure lines then the hydraulic system for the other part. The differences in the hydraulic systems can result in unequal flow to the closing cylinders with resultant unequal closing movement of the parts. Likewise, unequal frictional loading can result in unequal closing of the parts.

Improper closure of the parts because of non-linearity of valves and flow line and bearing variability adversely affects blow molding and can lead to parison collapse, parison rupture and possible undesired impact between the mold portions. Failure to control closing of the mold accurately may result in a mold half moving past the center parting plane and injuring a blow pin or other auxiliary equipment.

The foregoing problems are particularly acute in large accumulator head blow molding machines where the mold parts are conventionally closed by hydraulic cylinders along relatively long closure strokes and it is necessary that each mold part is closed along an exact predetermined time/distance closure path, independent of the hydraulic valves used to flow hydraulic fluid to the cylinders during closing, the attributes of the hydraulic systems through which fluid is flowed to the closing cylinders and variations in the platen bearings.

SUMMARY OF THE INVENTION

The invention is an improved blow molding machine of the type where the platens and mold parts are closed by hydraulic cylinders. Hydraulic fluid is flowed to the hydraulic cylinders for each platen by a control system with the ability to adjust the flow to compensate for non-linearity of the solenoid-type valve used to control the flow, variations in the hydraulic system which effect flow of hydraulic fluid to the closing cylinders and variations in the support bearings for the platens.

Closing of each platen and mold part in the blow molding machine from an open position to the fully closed position is controlled by a dedicated control system for the platen. At the beginning of the closing cycle a triggering event, typically closing of a switch, sends a simultaneous start signal to each of the systems. The systems then independently monitor closing of the platens and assure that each platen is moved along its predetermined time/distance closing path. Each system includes a programmable logic controller which generates a theoretical output signal dependent upon the position of the platen and the predetermined time/distance closing path for the platen. This theoretical signal is modified by a signal calibrating unit to compensate for the non-linearity of the hydraulic valve, variations in the hydraulic circuitry for the system and variations in the bearings for the platen to generate a work output signal. The work output signal is then transmitted to the hydraulic valve for the control system. In response to the work output signal, the valve flows the proper volume of hydraulic fluid to the closing hydraulic cylinder or cylinders to assure that the platen and supported mold part are moved along the desired time/distance closing path. The signal calibration units may be adjusted periodically during the production life of the blow molding machine to compensate for changes in the performance of the valves, the hydraulic lines and the mold support systems. A single setting of the calibrating unit compensates for all error sources to assure proper closing of the platen. Other sources of error, if any, are likewise compensated for.

Other objects and features of the invention will become apparent as the description proceeds, especially when taken in conjunction with the accompanying drawings illustrating the invention, of which there are two sheets and one embodiment.

DESCRIPTION OF THE PREFERRED EMBODIMENTS

Figure 1:
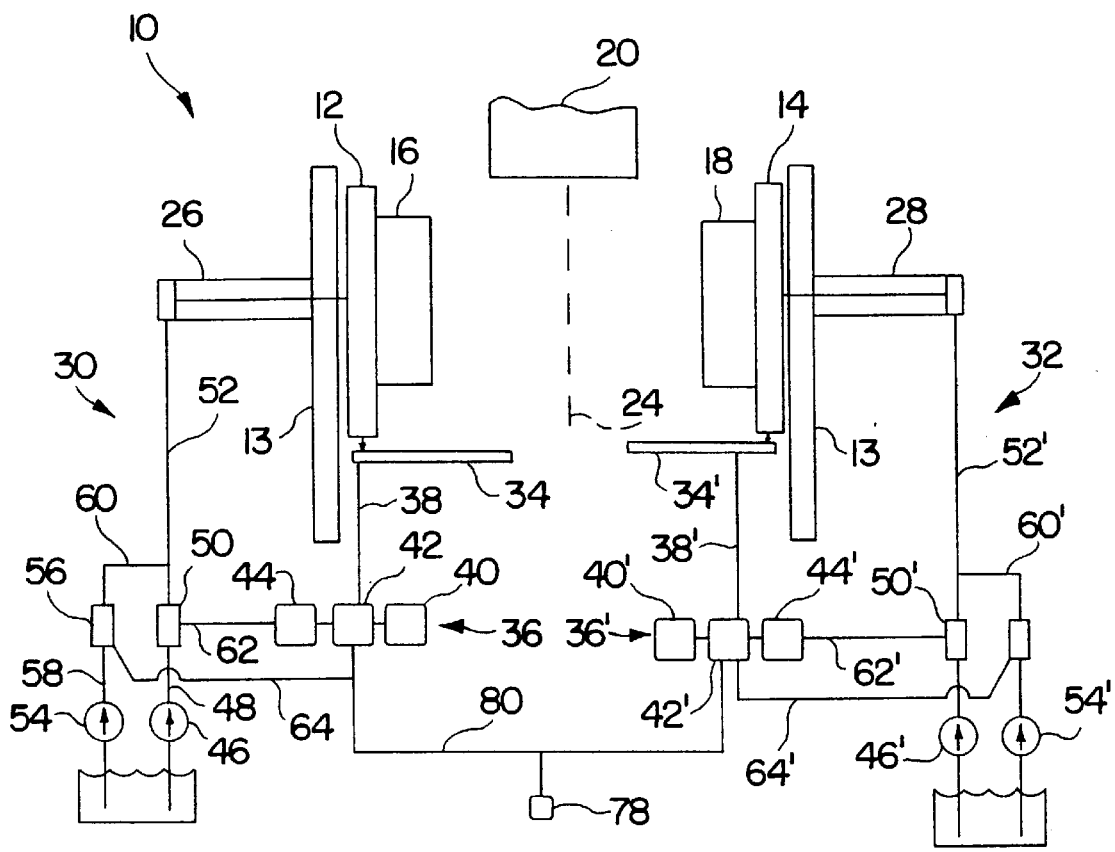
FIG. 1 is a schematic diagram of an accumulator type blow molding machine.

Accumulator head blow molding machine 10 includes a pair of spaced mold platens 12 and 14 mounted on frame members 13. Mold parts 16 and 18 are mounted on the front faces of platens 12 and 14 with suitable mold recesses formed in the front faces of the mold parts. The die of accumulator-type parison extrusion head 20 extrudes a parison 22 between the mold sections 16 and 18. Extrusion head 20 and parison 22 are preferably located on parting plane 24 defined by the location of the front faces of the mold parts 16 and 18 when the mold is fully closed. One or more high pressure hydraulic cylinders 26, 28 are connected to the rear faces of the platens and are used to move platens 12 and 14 and the mold parts on the platens from the open position shown in FIG. 1 to the fully closed position shown in FIG. 5. In a large accumulator head blow molding machine, as many as four high pressure cylinders 26, 28 may be used to close each platen and mold section. Each cylinder is mounted on a frame member 13 with the piston rod of the cylinder engaging the rear face of the platen as illustrated. The platens are retracted from the closed position to the open position by conventional small diameter return cylinders (not illustrated). Lines flowing hydraulic fluid displaced from cylinders 26 and 28 during extension of the cylinders are conventional and are not illustrated.

Figure 2:
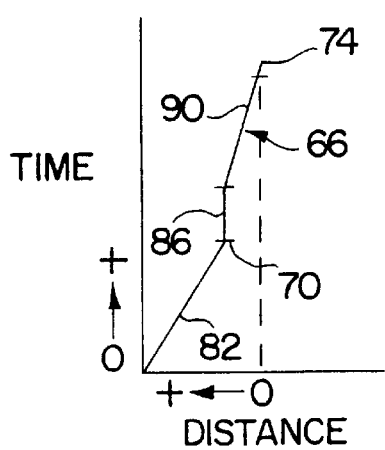
FIGS. 2 and 3 are graphs of time/distance closing paths.
Figure 3:
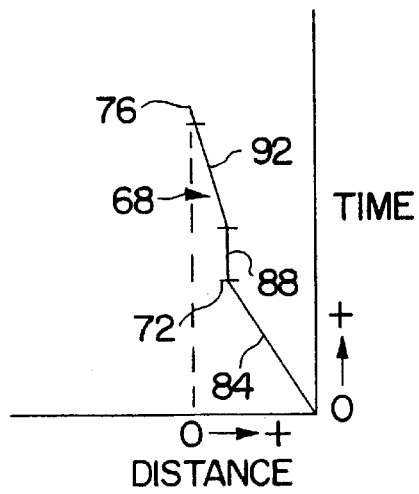

Each platen is moved from the open position to the closed position along an individually programmed time/distance path. FIG. 2 illustrates a time/distance closing path 66 for platen 12 and FIG. 3 illustrates a time/distance closing path 68 for platen 14. The platens are closed simultaneously along their respective paths. The closing paths may differ, depending upon the requirements of the particular blow molding operation performed by machine 10.

Drive system 30 moves platen 12 and supported mold part 16 from the open to the closed position along defined time/distance closing path 66. Like drive system 32 moves mold platen 14 and supported mold part from the open to the closed position along a defined time/distance closing path 68. System 30 will be described in detail, it being understood that system 32 includes components like the components of system 30 and operates like system 30. The components of system 32 are identified using the same reference numbers used to describe the components of system 30 with addition of a prime symbol('). The two PLCs 36 and 36' form parts of a single PLC assembly.

System 30 includes a horizontal transducer 34 mounted on the frame of machine 10 and connected to platen 12 to generate a signal indicative of the distance between the platen and parting plane 24. For instance, when the molds are fully opened the distance is at a maximum and when the molds are closed and in contact the distance is at a minimum. The output of linear transducer 34 is connected to a programmable logic controller (PLC) 36 through lead 38. Controller 36 includes a memory unit 40, a calculation unit 42 and a signal calibration unit 44. PLC 36 may be a MACO brand Series Controller manufactured by Barber Colman Company of Loves Park, Ill. The calculating unit 42 may be a specially programmed Barber Colman EZ PRO Position and Velocity Control mounted in the PLC.

System 30 also includes a low pressure hydraulic pump 46 connected to a hydraulic reservoir. The output of pump 46 is connected through hydraulic line 48 to proportional hydraulic valve 50. The output of valve 50 is connected to the extension input port of cylinder 26 through line 52. High pressure hydraulic pump 54 is connected to control valve 56 by pressure line 58. High pressure output flow from valve 56 is connected to pressure line 52 through line 60. Lead 62 connects signal calibration unit 44 to proportional hydraulic valve 50. Lead 64 connects calculation unit 42 to control valve 56.

"Each drive system 30, 32, includes a hydraulic/mechanical closing system made up of all of the mechanical and hydraulic components used during movement of the respective platen from the open position to the closed position. Each mechanical/closing system includes a hydraulic valve, hydraulic flow lines and the bearings mounting one of the platens on the frame."

During simultaneous closing of mold platens 12 and 14 the control systems 30 and 32 assure that each platen is closed accurately along the time/closing path of the platen as stored in memory units 40 and 40', variations in the operational parameters of the hydraulic/mechanical closing system, including despite non-linearity of the valve and flow line and platen bearing variation.

As each platen is closed the linear transducer 34, 34' for the platen generates a signal indicating the distance of the platen away from the parting plane 24. The calculating unit 42, 42' compares the actual distance of the platen from the parting plane to the desired distance of the platen from the parting plane, as stored in a memory unit, and generates a theoretical voltage output signal for the control system proportional hydraulic valve 50, 50'.

Valves 50 and 50' are solenoid-control valves and are precision manufactured. However, because the valving parts are moved by a solenoid the output of the valve is inherently non-linear. The valves are less responsive to a low voltage inputs than to higher voltage inputs.

The theoretical output signals of calculating units 42, 42' for valves 50, 50' are determined on assumptions that the valves operate linearly, that the two hydraulic lines are the same and that the platen bearings are the same. However, these assumptions concerning the operational closing parameters may be false. Signal calibration units 44, 44' calibrate the theoretical signals to the actual performance characteristics of valves 50, 50', the actual performance of the hydraulic lines for the controls and the actual performance of the bearings for the platens. During closing these units convert the theoretical linear output signals from the calculating units 42, 42' appropriately to generate working output signals conveyed through lines 64, 64' to valves 50, 50'. These working signals control the valves 50, 50' so that the flows passed through the valves move the platens along the desired time/distance closing paths. In this way, the PLCs 36 and 36' very accurately control the flow through proportional hydraulic valves 50, 50' and assure proper closing despite the inherent non-linearity of the valves and variations in the hydraulic and platen support systems.

After the two platens 12 and 14 are moved to the fully closed position by hydraulic fluid flowed through valves 50 and 50', the PLCs 36, 36' open high pressure valves 56 and 56' to pressurize the hydraulic fluid in pressure cylinders 26 and 28 and generate a high clamp pressure be t ween the two mold parts 16 and 18.

A cycle of operation of accumulator-type blow molding machine 10 will now be described.

The cycle of operation begins with the two mold platens 12 and 14 in the fully opened position. A volume of molten resin is accumulating in head 20. The article molded during the prior cycle has been withdrawn from between the open mold parts 16 and 18.

A cycle is started by actuation of switch 78, which may occur after removal of a previously molded article from between the molds to generate a signal. The signal is transmitted to PLCs 36 and 36' by lead 80. Each PLC then moves a platen toward the plane 24. PLC 36 of system 30 moves platen 12 inwardly from the open position to the closed position along rapid close portion 82 of the time/distance path 66 shown in FIG. 2. Likewise, PLC 36' of control system 32 moves platen 14 inwardly from the open position along rapid close portion 84 of the time/distance closing path 68 shown in FIG. 3. During movement along portions 82 and 84 of the paths valves 50, 50' flow closing hydraulic fluid rapidly to the hydraulic cylinders and move the platens 12 and 14 in from the fully opened positions to respective preclose positions 70 and 72 along paths 66 and 68. The platens may be moved to the preclose positions at a rate of 1,200 inches per minute. At the preclose positions the inner faces of mold parts 16 and 18 are spaced apart a distance slightly greater than then diameter of the parison 22 to be extruded by head 20. See FIG. 4. The platens are then dwelled by closing valves 50 and 50'. See dwell portions 86 and 88 of paths 66 and 68.

Figure 4:
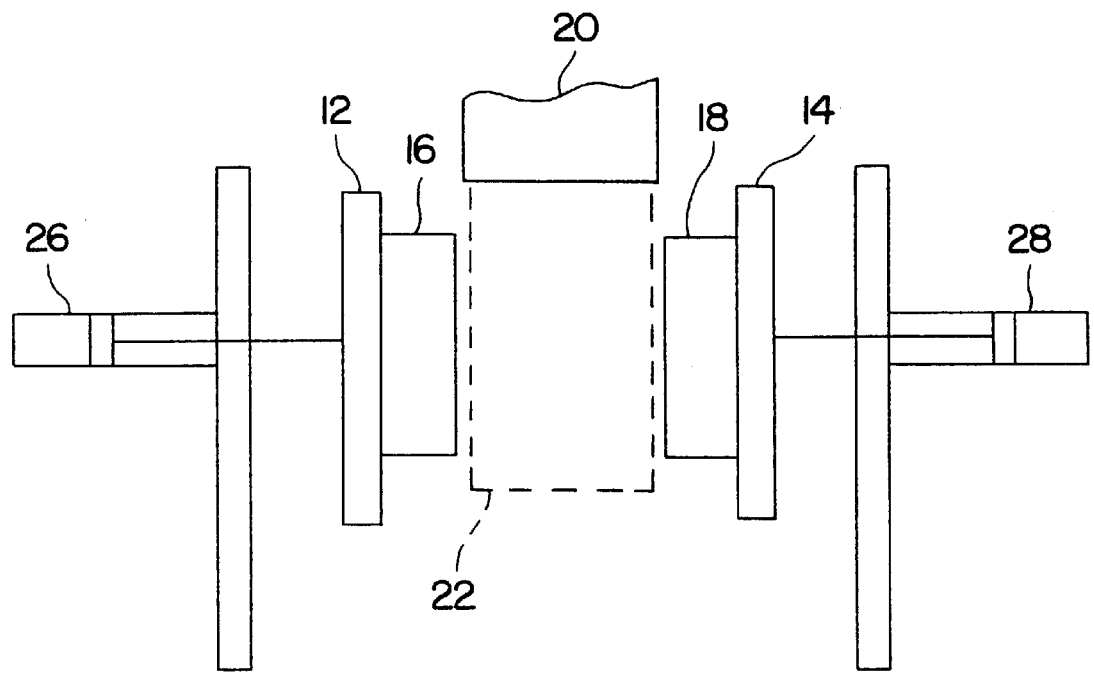
FIGS. 4 and 5 are schematic diagrams showing the molding machine in the preclose and closed positions, respectively.

With the mold parts in the preclose positions, as shown in FIG. 4, the accumulator head 20 extrudes parison 22 freely between the mold parts. After extrusion, the two programmable logic controllers 36 and 36' open valves 50 and 50' sufficiently to move the mold parts 16 and 18 inwardly from the preclose positions along path portions 90 and 92 to positions shortly before the fully closed position. During this portion of the cycle, the mold parts may be moved together at approximately one-half full closure speed or at a rate of about 600 inches per minute. Closure at this speed assures that contact between the mold parts and the parison does not tear the parison and that the parison properly conforms to the cavities in the mold parts. Once the mold parts have been closed to within a short distance before full closure, the programmable logic controllers slow final closure to a rate of about 120 inches per minute in order to avoid impact injury to the mold parts on closing and to assure proper control of parison pinch-off by the mold parts.

Figure 5:
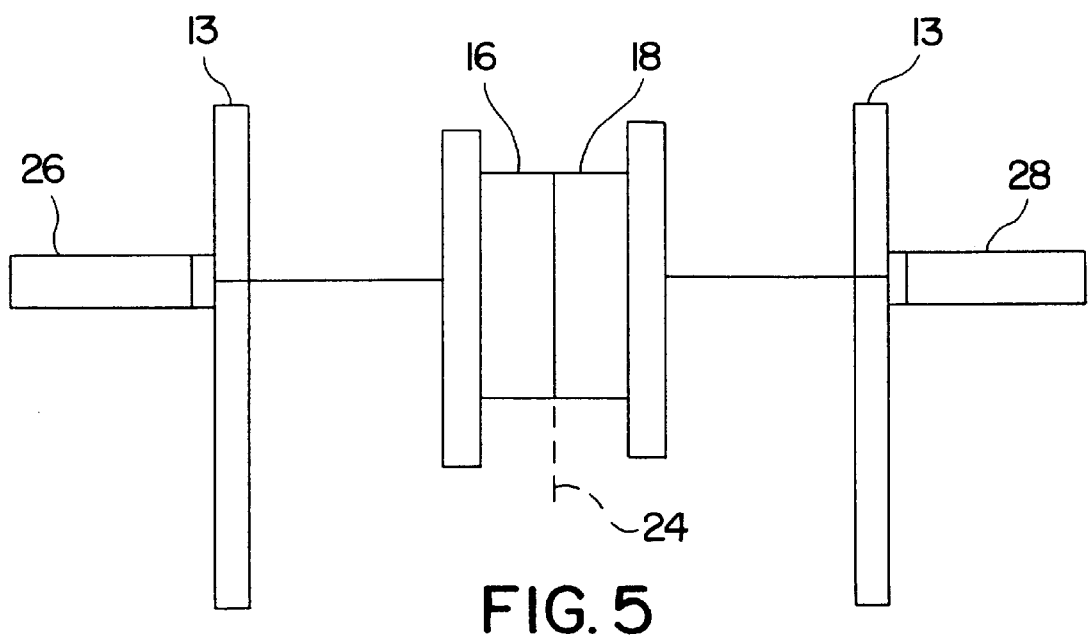

With the molds fully closed at positions 74 and 76 as shown in FIGS. 2, 3 and 5 and the parison captured in the cavity between the mold parts, the programmable logic controllers open valves 56 and 56' to increase the pressure of the hydraulic fluid in the closing hydraulic cylinders. This hydraulic fluid may have a pressure as high as 2,800 pounds per square inch and exerts a high clamp pressure between the mold parts, which may be as great as 190 tons. The captured parison is then blown in the cavity to form the desired article. After blowing, pressure is maintained in the article during a cooling period required to cool the molded plastic and form a solid shaped article. The cooling period may be as long as a number of minutes, depending upon the shape and thickness of the molded article. After cooling, an air port is opened to reduce the pressure within the molded article, valves 56, 56' and 50, 50' are closed by the PLCs and the return hydraulic cylinders are collapsed to open the mold and return the platens and mold parts rapidly to the open position of FIG. 1. Extraction tooling is then extended into the space between the mold parts to engage and remove the molded article, completing a cycle of operation.

Accumulator head blow molding machine 10 as illustrated is particularly adapted to blow mold large sized plastic articles having relatively thick walls up to, for instance, 0.375 inches thick. The parison 22 may have a 12 inch diameter, a 6 foot length and a total weight of about 40 pounds. The article molded by machine 10 may have a 6 foot length and exterior diameter of 17 inches or more.

When fully opened, the front faces of the mold may be spaced apart about 48 inches in order to provide sufficient space for extraction tooling to be extended between the mold parts to engage and withdraw the blown article.

The closure of each platen and mold part is controlled by an independent control systems 30, 32. These systems are actuated by a common start signal and must very accurately control the closure of the two platens to assure that each platen is accurately moved along a relatively long time/distance path and close properly. The closing path for each platen may be 2 feet long. Very accurate control of closing motion of the platens is required to assure rapid cycling of machine 10 with proper positioning of the platens in the required locations, proper closing of the mold parts on the parison and proper movement of the molds parts to or immediately adjacent the parting plane prior to application of the high pressure clamp force.

Blow molding machine 10 includes a closing control system 30, 32 for each mold platen 12, 14. However, it is contemplated that a single closing control system as described may be provided to control closing of a single platen with a different closing system used to control closing of the other platen. For instance, a conventional mechanical chain, rack and pinion or toggle closing system may be used to close the other platen. A different type of PLC closing system may also be used to extend a hydraulic cylinder or cylinders to close the other platen.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What is claimed is:

1. An accumulator blow molding machine comprising, a frame; first and second platens; bearings movably mounting each platen on the frame; first and second mold parts on said first and second platens respectively, recesses in the mold parts defining a mold cavity when the mold parts are closed; an accumulator extrusion head located above the mold parts to extrude a parison between the mold parts; a source of pressurized hydraulic fluid; first and second hydraulic drives associated with said first and second platens respectively, each hydraulic drive including a hydraulic closing cylinder connected to a platen to move such platen from an open position to a closed position, the hydraulic cylinder having an extension inlet port, a hydraulic line extending from the source of hydraulic fluid to the extension inlet port of the hydraulic cylinder and a hydraulic valve in the hydraulic line; first and second hydraulic cylinder closing control systems associated with said first and second platens respectively, each closing system including a linear transducer mounted on the frame and connected to an associated platen to generate a signal proportional to the position of such platen relative to the frame, a controller having a memory unit to store predetermined time/distance closing path information for such associated platen relative to the frame, a calculation unit connected to the memory unit and to the linear transducer to receive said signal and closing path information and then calculate a theoretical output signal, a connection between the calculation unit and the valve for the associated platen, and a signal calibration unit to alter said theoretical output signal to compensate for variations in the operational closing parameters of the bearings, hydraulic line and hydraulic valve for the associated platen, said calibration unit located in the connection between the calculation unit and such hydraulic valve, wherein each signal calibration unit calibrates the theoretical output signal for the associated platen to a work output signal, the hydraulic valve for the associated platen is actuated by the work output signal and the associated platen is closed along the predetermined closing path.

2. A machine as in claim 1 including a cycle actuation switch and a connection between the switch and each closing system.

3. A machine as in claim 1 wherein each valve includes a solenoid connected to a valving part to move said part.

4. A machine as in claim 3 including four hydraulic closing cylinders and a single return hydraulic cylinder connected to each platen.

5. A blow molding machine comprising, a frame; first and second platens; bearings movably mounting each platen on the frame; first and second mold parts on said first and second platens respectively, recesses in the mold parts defining a mold cavity when the mold parts are closed; an extrusion head located above the mold parts to extrude a parison between the mold parts; a source of hydraulic fluid, a hydraulic pump for flowing hydraulic fluid from the source; a first hydraulic closing cylinder connected to said first platen to move said platen and supported mold part from an open position to a closed position, said hydraulic cylinder having an extension inlet port; a first closing control system for said first platen, said first closing system including a hydraulic line extending from the hydraulic pump to the extension inlet port of said hydraulic cylinder and a hydraulic valve in said line, a first transducer operatively mounted between the frame and said first platen to generate a signal indicating the position of such platen relative to the frame, a controller having a memory unit to store predetermined time/distance closing path information for such platen, a calculation unit connected to the memory unit and to the transducer to receive said signal and closing path information and then calculate a theoretical output signal, a first signal calibration unit connected to the calculation unit to alter said theoretical output signal to compensate for variations in the operational closing parameters of the bearings, hydraulic line and hydraulic valve for the first platen and generate a work output signal, a connection between the signal calibration unit and hydraulic valve, wherein the hydraulic valve is actuated by the work output signal and the first platen is closed along the predetermined closing path.

6. A blow molding machine as in claim 5 including a mechanical connection between the platens.

7. A blow molding machine as in claim 5 wherein said hydraulic valve comprises a solenoid-control valve.

8. A blow molding machine as in claim 7 wherein said extrusion head comprises a resin accumulator.

9. A blow molding machine as in claim 8 including an actuation switch for the closing system.

10. A blow molding machine as in claim 9 wherein said mold platens are each moved approximately 2 feet during closing and contact each other at a parting plane under the extrusion head.

11. A method of blow molding a plastic article using a blow molding machine including a frame, a pair of platens, bearings mounting the platens on the frame, mold parts mounted on the platens, a hydraulic closing cylinder connected to one platen to move the platen from an open position to a closed position, a source of hydraulic fluid, a flow line extending from the source to the closing cylinder, a hydraulic valve in the flow line for controlling flow of hydraulic fluid to the cylinder during closing, and a parison extrusion head located above the mold parts, comprising the steps of:

a) positioning the platens in an open position with the mold parts to either side of and below the extrusion head and the hydraulic cylinder collapsed;

b) extending the hydraulic cylinder while moving the platens and mold parts from the open position to a closed position with the mold parts engaging each other at a parting plane under the extrusion head;

c) extruding a parison down from the head between the platens before the mold parts are closed and capturing the parison between the closed mold parts;

d) during closing movement of the one platen,
  i) generating a theoretical output signal proportional to the position of such platen relative to the frame and to a predetermined time/distance closing path for such platen;
  ii) generating a work output signal by calibrating the theoretical output signal to compensate for variations in an operational closing parameter of one of A) the bearings for the one platen, B) the hydraulic valve, or C) the flow line; and
  iii) controlling the valve flowing hydraulic fluid to the hydraulic cylinder for such platen in response to the work output signal so that during closing such platen does not deviate from the predetermined time/distance path because of variations in the operational closing parameter of said one of A) the bearings for the one platen, B) the hydraulic valve, or C) the flow line;

e) expanding the captured parison in the closed mold parts to form an article;

f) opening the mold parts; and g) removing the article from between the open mold parts.

12. The method of claim 11 including the step of:

h) calibrating the theoretical output signal for said one platen to compensate for variations in the operational closing parameters of A) the bearing for the one platen, B) the hydraulic valve, and C) the flow line.

13. The method of claim 12 including the step of:

i) dwelling closing movement of the platens with the mold parts in a preclose position and extruding the parison between the dwelled mold parts prior to closing the mold parts on the parison.

14. The method of claim 13 including the step of:

j) moving the platens from the open position to the preclose position at a first rate; moving the platens from the preclose position to a nearly closed position at a second rate less than the first rate; and moving the platens closed at a third rate less than the second rate.

15. A machine as in claim 1 wherein said source of pressurized hydraulic fluid includes a hydraulic pump.

16. A machine as in claim 1 wherein said hydraulic drives are independent.

17. A machine as in claim 1 wherein said source of hydraulic fluid includes a first hydraulic pump for the first hydraulic drive and a second hydraulic pump for the second hydraulic drive.

18. A blow molding machine as in claim 5 wherein said transducer comprises a linear transducer mounted on the frame and connected to said first platen.

19. A blow molding machine comprising, a frame; first and second platens movably mounted on the frame; first and second mold parts on said first and second platens respectively, recesses in the mold parts defining a mold cavity when the mold parts are closed; an extrusion head located above the mold parts to extrude a parison between the mold parts; a source of hydraulic fluid; a hydraulic/mechanical closing system for moving said first platen and supported mold part from an open position to a closed position, the closing system including a hydraulic cylinder connected between the frame and the first platen and a hydraulic valve for controlling flow of hydraulic fluid to the hydraulic cylinder; first means for generating a first signal proportional to the position of the first platen; second means for storing predetermined time/distance closing path information for the first platen; third means connected to said first means and said second means to receive said first signal and said closing path information and then calculate a theoretical output signal for said hydraulic valve, and forth means connected to said third means and to said hydraulic valve for calibrating the theoretical output signal to compensate for variations in the operational closing performance of the hydraulic/mechanical closing system and then generating a work output signal, wherein the hydraulic valve is actuated by the work output signal and the first platen is closed along the predetermined closing path.

20. A blow molding machine as in claim 19 wherein the hydraulic valve includes a solenoid.

21. A blow molding machine as in claim 20 wherein said closing system includes bearings mounting the first platen on the frame, a source of pressurized hydraulic fluid, and hydraulic fluid flow lines.

22. A method of blow molding a plastic article using a blow molding machine including a frame, a pair of platens on the frame, mold parts mounted on the platens, a hydraulic/mechanical closing system for moving a first platen and a supported mold part from an open position to a closed position, the closing system including a first hydraulic cylinder connected to the first platen and a hydraulic valve for flowing fluid to the first cylinder during closing, and a parison extrusion head located above the mold parts, comprising the steps of:

a) positioning the platens in an open position with the mold parts to either side of and below the extrusion head and the hydraulic cylinder collapsed;

b) extending the hydraulic cylinder while moving the platens and mold parts from the open position to a closed position with the mold parts engaging each other at a parting plane under the extrusion head;

c) extruding a parison down from the head between the platens before the mold parts are closed and capturing the parison between the closed mold parts;

d) during closing movement of the one platen,
   i) generating a theoretical output signal proportional to the position of such platen relative to the frame and to a predetermined time/distance closing path for such platen;
   ii) generating a work output signal by calibrating the theoretical output signal to compensate for variations in the operational parameters of the hydraulic/mechanical closing system; and
   iii) controlling the hydraulic valve for the first platen in response to the work output signal so that the first platen closes along the predetermined time/distance path;

e) expanding the captured parison in the closed mold parts to form an article;

f) opening the mold parts; and g) removing the article from between the open mold parts.

* * * * *

UNITED STATES PATENT AND TRADEMARK OFFICE
CERTIFICATE OF CORRECTION

PATENT NO. : 6,054,076
DATED : April 25, 2000
INVENTOR(S) : William H. McKeon

It is certified that error appears in the above-identified patent and that said Letters Patent is hereby corrected as shown below:

Column 1, line 51, replace "affect" with --effect--.
Column 4, line 6, delete the opening quotation mark; line 12 delete the closing quotation mark; line 16, following "40'" insert -- despite--, line 18, following "including" delete "despite."

In the Claims
Claim 9, line 19, replace "forth" with --fourth--.

Signed and Sealed this

Twenty-seventh Day of February, 2001

Attest:

NICHOLAS P. GODICI

Attesting Officer    Acting Director of the United States Patent and Trademark Office